United States Patent
Ichikawa et al.

(10) Patent No.: US 10,069,335 B2
(45) Date of Patent: Sep. 4, 2018

(54) POWER TRANSFER SYSTEM WITH CAPACITIVE COUPLING

(71) Applicant: Murata Manufacturing Co., Ltd., Nagaokakyo-shi, Kyoto-fu (JP)

(72) Inventors: Keiichi Ichikawa, Nagaokakyo (JP); Tsuyoshi Suesada, Nagaokakyo (JP); Henri Bondar, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 206 days.

(21) Appl. No.: 15/252,652

(22) Filed: Aug. 31, 2016

(65) Prior Publication Data

US 2016/0372978 A1 Dec. 22, 2016

Related U.S. Application Data

(63) Continuation of application No. PCT/JP2015/065185, filed on May 27, 2015.

(30) Foreign Application Priority Data

Jun. 3, 2014 (JP) .................. 2014-114868

(51) Int. Cl.
| | | |
|---|---|---|
| H04B 5/00 | (2006.01) | |
| H02J 50/05 | (2016.01) | |
| H02J 50/70 | (2016.01) | |
| H02J 7/02 | (2016.01) | |
| H02J 50/12 | (2016.01) | |
| H02M 7/06 | (2006.01) | |
| H02M 7/537 | (2006.01) | |
| H02M 7/5383 | (2007.01) | |
| H02J 50/10 | (2016.01) | |

(52) U.S. Cl.
CPC .............. *H02J 50/05* (2016.02); *H02J 7/025* (2013.01); *H02J 50/10* (2016.02); *H02J 50/12* (2016.02); *H02J 50/70* (2016.02); *H02M 7/06* (2013.01); *H02M 7/537* (2013.01); *H02M 7/5383* (2013.01); *H04B 5/0012* (2013.01)

(58) Field of Classification Search
CPC ............................. H02J 50/05; H04B 5/0012
USPC ........................................................ 307/109
See application file for complete search history.

(56) References Cited

U.S. PATENT DOCUMENTS

| | | |
|---|---|---|
| 2014/0175907 A1 | 6/2014 | Takahashi et al. |
| 2014/0300201 A1 | 10/2014 | Ichikawa et al. |
| 2016/0006271 A1 | 1/2016 | Ichikawa et al. |

FOREIGN PATENT DOCUMENTS

| | | | |
|---|---|---|---|
| WO | WO 2013054800 A1 | 4/2013 | |
| WO | WO 2013073508 A1 | 5/2013 | |
| WO | WO 2014148369 A1 | 9/2014 | |

OTHER PUBLICATIONS

International Search Report issue for PCT/JP2015/065185, dated Aug. 18, 2015.

(Continued)

*Primary Examiner* — Adi Amrany
(74) *Attorney, Agent, or Firm* — Arent Fox LLP

(57) ABSTRACT

A power transfer system that transfers electric power from a power transmission device to a power reception device through electrical coupling. The power transmission device and the power reception device structurally designed such that the power transfer system is able to stabilize reference potentials of the power transmission device and the power reception device when the power reception device is placed on the power transmission device.

20 Claims, 10 Drawing Sheets

(56) References Cited

OTHER PUBLICATIONS

Written Opinion of the International Search Report issued for PCT/US2015/065185, dated Aug. 18, 2015.

POWER TRANSFER SYSTEM WITH CAPACITIVE COUPLING

CROSS REFERENCE TO RELATED APPLICATIONS

The present application is a continuation of PCT/JP2015/065185 filed May 27, 2015, which claims priority to Japanese Patent Application No. 2014-114868, filed Jun. 3, 2014, the entire contents of each of which are incorporated herein by reference.

FIELD OF THE INVENTION

The present disclosure relates to a power transfer system in which electric power is transferred from a power transmission device to a power reception device through capacitive coupling (electrical coupling).

BACKGROUND OF THE INVENTION

Power transfer systems employing electrical coupling methods are known. In these power transfer system, active electrodes of a power transmission device and a power reception device are located in proximity to each other via a gap, and passive electrodes of the power transmission device and the power reception device are located in proximity to each other via a gap, so that large capacitances are formed between the electrodes, and the electrodes are electrically coupled to each other. Accordingly, electric power transfer between the power transmission device and the power reception device is enabled with high transfer efficiency even if the electrodes of the power transmission device and the power reception device are not in contact with each other.

Examples of the power reception device of the power transfer system include electronic devices such as a cellular phone. In recent years, an electrostatic capacity type input unit (touch panel) having good operability is used in these electronic devices and the like in many cases. In the case where a power reception device is equipped with a touch panel, a situation is possible in which the touch panel is operated while the power reception device is placed on the power transmission device to be charged. In this case, a reference potential at the power reception device side varies, so that the power reception device may malfunction.

Patent Document 1 discloses a power transfer system that stabilizes a reference potential of a power reception device by connecting the reference potential of the power reception device to a power transmission device having relatively small variation of a reference potential. In the power transfer system disclosed in Patent Document 1, each of the power transmission device and the power reception device has a reference potential electrode connected to the reference potential, and the reference potential electrodes are opposed to each other. Thus, the reference potential of the power reception device is connected to the reference potential of the power transmission device, so that the potential of the power reception device is stabilized and operation of the power reception device is stabilized.

Patent Document 1: International Publication No. 2013/054800.

Meanwhile, when the power reception device is placed on the power transmission device, for example, a capacitance (hereinafter, referred to as "cross capacitance") may be formed between different types of electrodes, for example, between the active electrode of the power transmission device and the passive electrode of the power reception device. The cross capacitance increases particularly if a displacement occurs when the power reception device is placed on the power transmission device. In Patent Document 1, the influence of such a cross capacitance is not taken into consideration, and the reference potential at the power reception device side varies due to the cross capacitance, so that the power reception device may malfunction.

SUMMARY OF THE INVENTION

Therefore, an object of the present disclosure is to provide a power transfer system that allows reference potentials of a power transmission device and a power reception device to be stabilized when the power reception device is placed on the power transmission device.

A power transfer system is provided that includes a power transmission device including a first power-transmission-side electrode, a second power-transmission-side electrode, a power-transmission-side reference potential electrode connected to a power-transmission-side reference potential, and a voltage applying circuit configured to apply a voltage to the first power-transmission-side electrode and the second power-transmission-side electrode; and a power reception device including a first power-reception-side electrode, a second power-reception-side electrode, a power-reception-side reference potential electrode connected to a power-reception-side reference potential, and a load circuit configured to supply a voltage generated in the first power-reception-side electrode and the second power-reception-side electrode, to a load. Moreover, the power reception device is placed on the power transmission device to oppose the first power-transmission-side electrode and the first power-reception-side electrode to each other, to oppose the second power-transmission-side electrode and the second power-reception-side electrode to each other, and to oppose the power-transmission-side reference potential electrode and the power-reception-side reference potential electrode to each other, thereby to transfer electric power from the power transmission device to the power reception device through electrical coupling. In the exemplary embodiment, the power transmission device includes a first power-transmission-side capacitor and a second power-transmission-side capacitor connected in series between the first power-transmission-side electrode and the second power-transmission-side electrode, a connection point between the first power-transmission-side capacitor and the second power-transmission-side capacitor is connected to the power-transmission-side reference potential electrode, the power reception device includes a first power-reception-side capacitor and a second power-reception-side capacitor connected in series between the first power-reception-side electrode and the second power-reception-side electrode.

Moreover, according to the exemplary embodiment, a connection point between the first power-reception-side capacitor and the second power-reception-side capacitor is connected to the power-reception-side reference potential electrode, and when: a connection point between the first power-transmission-side electrode and the first power-transmission-side capacitor is represented by P1; a connection point between the first power-reception-side electrode and the first power-reception-side capacitor is represented by P2; a connection point between the second power-transmission-side electrode and the second power-transmission-side capacitor is represented by P3; a connection point between the second power-reception-side electrode and the second power-reception-side capacitor is represented by P4; the connection point between the first power-transmission-side capacitor and the second power-transmission-side capacitor is represented by P5; the connection point between the first power-reception-side capacitor and the second power-reception-side capacitor is represented by P6; a parasitic capacitance occurring between P1 and P4 is represented by $C_{14}$; a parasitic capacitance occurring between P1 and P6 is represented by $C_{16}$; a parasitic capacitance occurring between P2 and P3 is represented by $C_{23}$; a parasitic capacitance occurring between P2 and P5 is represented by $C_{25}$; a parasitic capacitance occurring between P3 and P6 is represented by $C_{36}$; a parasitic capacitance occurring between P4 and P5 is represented by $C_{45}$; capacitances of the first power-transmission-side capacitor and the second power-transmission-side capacitor are represented by $C_{15}$ and $C_{35}$, respectively; capacitances of the first power-reception-side capacitor and the second power-reception-side capacitor are represented by $C_{26}$ and $C_{46}$, respectively; a capacitance occurring between the first power-transmission-side electrode and the first power-reception-side electrode is represented by $C_A$; and a capacitance occurring between second power-transmission-side electrode and the second power-reception-side electrode is represented by $C_P$. The power transmission device and power reception device are arranged such that the following formulas are satisfied according to the exemplary embodiment:

[Math. 1]

$$\frac{1+\frac{C_{35}}{C_{25}+C_{45}}\cdot\frac{\Sigma G}{C_P+C_{23}}}{1+\frac{C_{15}}{C_{25}+C_{45}}\cdot\frac{\Sigma G}{C_A+C_{14}}} = \frac{1+\frac{C_{36}}{C_{26}+C_{46}}\cdot\frac{\Sigma G}{C_P+C_{23}}}{1+\frac{C_{16}}{C_{26}+C_{46}}\cdot\frac{\Sigma G}{C_A+C_{14}}} \quad (1)$$

$$\frac{1+\frac{C_{45}}{C_{15}+C_{35}}\cdot\frac{\Sigma L}{C_P+C_{14}}}{1+\frac{C_{25}}{C_{15}+C_{35}}\cdot\frac{\Sigma L}{C_A+C_{23}}} = \frac{1+\frac{C_{46}}{C_{16}+C_{36}}\cdot\frac{\Sigma L}{C_P+C_{14}}}{1+\frac{C_{26}}{C_{16}+C_{36}}\cdot\frac{\Sigma L}{C_A+C_{23}}} \quad (2)$$

Moreover, according to the exemplary embodiment $\Sigma G = C_A + C_P + C_{14} + C_{23} + C_{26} + C_{46} + C_{25} + C_{45}$, and $\Sigma L = C_A + C_P + C_{14} + C_{23} + C_{16} + C_{36} + C_{15} + C_{35}$.

In this configuration, by satisfying formulas (1) and (2) (hereinafter, referred to as stable condition) which take a cross capacitance into consideration, it is possible to cause the reference potential of the power reception device to approach the reference potential of the power transmission device. Thus, the disclosed system stabilizes the reference potentials of the power transmission device and the power reception device. Accordingly, the disclosed system prevents problems caused due to the reference potentials being unstable.

Preferably, the first power-transmission-side electrode and the second power-transmission-side electrode have a flat plate shape and are provided on the same plane, the first power-reception-side electrode and the second power-reception-side electrode have a flat plate shape and are provided on the same plane, and the power-transmission-side reference potential electrode and the power-reception-side reference potential electrode have a flat plate shape and are opposed to each other with the first power-transmission-side electrode and the second power-transmission-side electrode and the first power-reception-side electrode and the second power-reception-side electrode being interposed therebetween.

In this configuration, the disclosed power transfer system satisfies the stable condition for the reference potentials only through minimal adjustments of the shapes of the electrodes, the sizes of the electrodes, or the distance between the electrodes, etc.

Preferably, the power transmission device includes a first insulating layer and a second insulating layer laminated inward from a placement surface of a housing that is in contact with the placed power reception device, the first power-transmission-side electrode and the second power-transmission-side electrode are formed between the first insulating layer and the second insulating layer, the power-transmission-side reference potential electrode is formed at an outermost layer of the second insulating layer at a side opposite to the first insulating layer, the power reception device includes a third insulating layer and a fourth insulating layer laminated inward from a placement surface of a housing that is in contact with the placed power transmission device, the first power-reception-side electrode and the second power-reception-side electrode are formed between the third insulating layer and the fourth insulating layer, the power-reception-side reference potential electrode is formed at an outermost layer of the fourth insulating layer at a side opposite to the third insulating layer, a ratio between a dielectric constant and a thickness of each of the second insulating layer and the fourth insulating layer is uniform in a planar direction, and the first insulating layer and the third insulating layer have dielectric constants equal to each other, and a ratio between the dielectric constant and a total thickness of the first insulating layer and the third insulating layer is uniform in the planar direction.

According to this configuration, it is possible to satisfy the stable condition for the reference potentials by fine adjustment of the thickness and the dielectric constant of the insulating layer or addition of a small correction capacitance.

Preferably, in the first insulating layer, a dielectric constant of a region at least either between the first power-transmission-side electrode and the power-transmission-side reference potential electrode or between the second power-transmission-side electrode and the power-transmission-side reference potential electrode is different from that of another region.

In this configuration, even when the first power-transmission-side electrode or the second power-transmission-side electrode has a thickness and the thickness of the first insulating layer is not uniform in the planar direction, it is possible to make the ratio between the dielectric constant and the thickness uniform in the planar direction by changing the dielectric constant between the electrodes.

Preferably, in the fourth insulating layer, a dielectric constant of a region at least either between the first power-reception-side electrode and the power-reception-side reference potential electrode or between the second power-reception-side electrode and the power-reception-side reference potential electrode is different from that of another region.

In this configuration, even when the first power-reception-side electrode or the second power-reception-side electrode has a thickness and the thickness of the fourth insulating layer is not uniform in the planar direction, it is possible to make the ratio between the dielectric constant and the thickness uniform in the planar direction by changing the dielectric constant between the electrodes.

Preferably, any one of the power transmission device and the power reception device includes a capacitance adjustment element, and formulas (1) and (2) are satisfied including a capacitance of the capacitance adjustment element.

In this configuration, even after the electrodes are formed, the disclosed power transfer system can satisfy the stable condition for the reference potentials by adding a minimal capacitance element.

Preferably, the power-transmission-side reference potential electrode has a recess, a projection, or a cavity in a portion thereof opposed to at least one of the first power-transmission-side electrode and the second power-transmission-side electrode.

In this configuration, even when the first power-transmission-side electrode or the second power-transmission-side electrode has a thickness and the thickness of the first insulating layer is not uniform in the planar direction, it is possible to change the thickness of the first insulating layer by forming a recess or the like in the power-transmission-side reference potential electrode. Thus, it is possible to make the ratio between the dielectric constant and the thickness of the first insulating layer uniform in the planar direction.

Preferably, the power-reception-side reference potential electrode has a recess, a projection, or a cavity in a portion thereof opposed to at least one of the first power-reception-side electrode and the second power-reception-side electrode.

In this configuration, even when the first power-reception-side electrode or the second power-reception-side electrode has a thickness and the thickness of the fourth insulating layer is not uniform in the planar direction, it is possible to change the thickness of the fourth insulating layer by forming a recess or the like in the power-reception-side reference potential electrode. Thus, it is possible to make the ratio between the dielectric constant and the thickness of the fourth insulating layer uniform in the planar direction.

According to the present invention, by configuring the power transmission and reception devices to satisfy the formulas (1) and (2), the reference potential of the power reception device will approach the reference potential of the power transmission device. Thus, the reference potentials of the power transmission device and the power reception device can be stabilized. Accordingly, problems caused due to unstable reference potentials can be prevented.

DETAILED DESCRIPTION OF THE EMBODIMENTS

Figure 1:
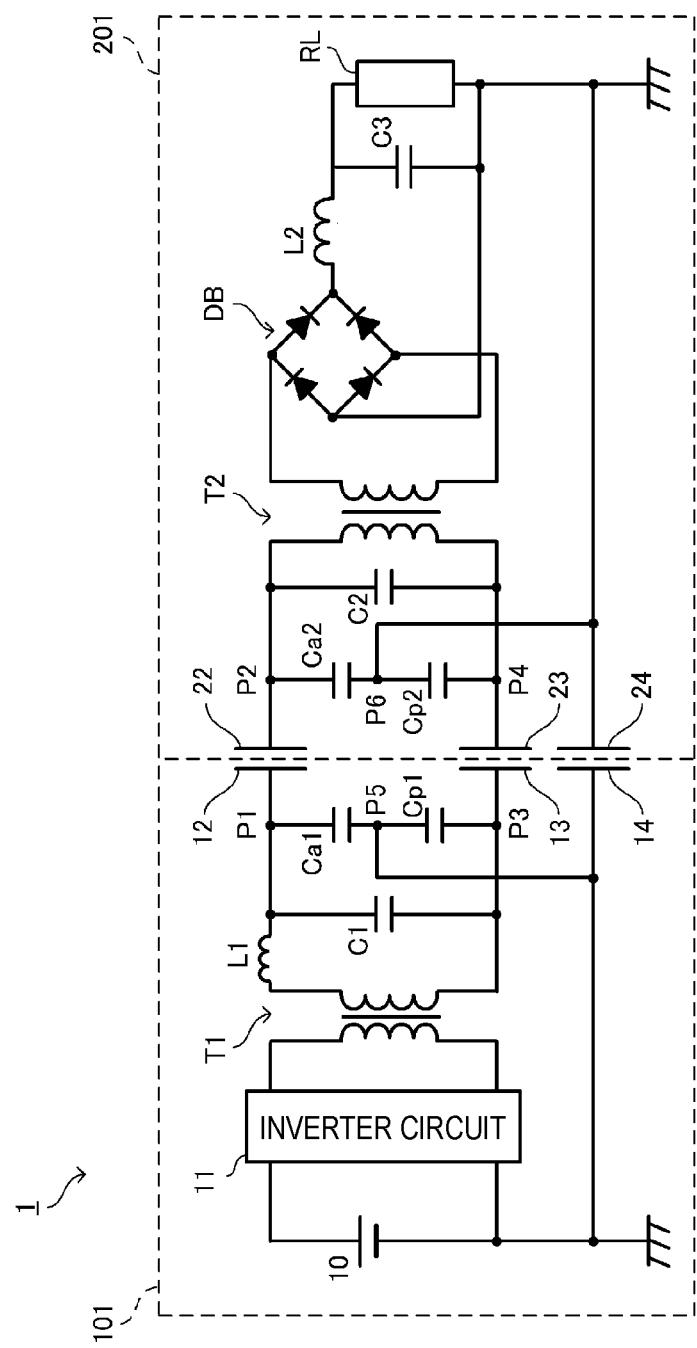
FIG. 1 is a circuit diagram of a power transfer system according to an embodiment.

FIG. 1 is a circuit diagram of a power transfer system 1 according to an embodiment.

The power transfer system 1 includes a power transmission device 101 and a power reception device 201. The power reception device 201 includes a load circuit RL. The load circuit RL includes a charging circuit and a secondary battery. The secondary battery may be attachable to/detachable from the power reception device 201. The power reception device 201 is, for example, a portable electronic device including the secondary battery. Examples of the portable electronic device include a cellular phone, a portable music player, a notebook PC, and a digital camera. The power transmission device 101 is a charging stand for charging the secondary battery of the power reception device 201 placed thereon.

The power transmission device 101 includes a power supply 10 that outputs a DC voltage. The power supply 10 is an AC adapter. The AC adapter is connected to a commercial power supply and converts AC 100-240 V to, for example, DC 5 V or 19 V.

An inverter circuit 11 is connected to the power supply 10. The inverter circuit 11 includes four switching elements composed of MOS-FETs. The switching elements are subjected to PWM control by a driver that is not shown. The inverter circuit 11 converts the DC voltage from the power supply 10 to an AC voltage by the switching elements being turned on or off.

The primary winding of a step-up transformer T1 is connected to the output side of the inverter circuit 11. The AC voltage resulting from the conversion by the inverter circuit 11 is applied to the step-up transformer T1. An active electrode 12 and a passive electrode 13 are connected to the secondary winding of the step-up transformer T1. The step-up transformer T1 steps up the AC voltage applied from the inverter circuit 11, and applies the AC voltage to the active electrode 12 and the passive electrode 13.

The active electrode 12 corresponds to a "first power-transmission electrode" according to the present disclosure. The passive electrode 13 corresponds to a "second power-transmission electrode" according to the present disclosure.

In addition, the power transmission device 101 includes a reference potential electrode 14. The reference potential electrode 14 is connected to a reference potential of the power transmission device 101. The reference potential of the power transmission device 101 is equal to an absolute earth potential, and is desirably connected to earth (or a desk or the like on which the power transmission device 101 is put). The reference potential electrode 14 corresponds to a "power-transmission reference potential electrode" according to the present disclosure.

Capacitors Ca1 and Cp1 connected in series are connected to the active electrode 12 and the passive electrode 13. Although described in detail later, the capacitors Ca1 and Cp1 are provided for the purpose of stabilizing a reference potential of the power reception device 201. A connection point between the capacitors Ca1 and Cp1 is connected to the reference potential of the power transmission device 101. The capacitor Ca1 corresponds to a "first power-transmission capacitor" according to the present disclosure, and the capacitor Cp1 corresponds to a "second power-transmission capacitor" according to the present disclosure.

A capacitor C1 is connected to the secondary winding of the step-up transformer T1. The capacitor C1 forms a series resonant circuit together with a leakage inductance L1 of the step-up transformer T1.

The power reception device 201 includes an active electrode 22 and a passive electrode 23. The active electrode 22 corresponds to a "first power-reception electrode" according to the present disclosure, and the passive electrode 23 corresponds to a "second power-reception electrode" according to the present disclosure. When the power reception device 201 is placed (mounted) on the power transmission device 101, the active electrodes 12 and 22 are opposed to each other via a gap, and the passive electrodes 13 and 23 are opposed to each other via a gap. Because of this opposed arrangement, electrostatic capacities are formed between the active electrodes 12 and 22 and between the passive electrodes 13 and 23 to achieve electrical coupling. Electric power is transferred from the power transmission device 101 to the power reception device 201 through this coupling.

Capacitors Ca2 and Cp2 connected in series are connected to the active electrode 22 and the passive electrode 23. Similarly to the capacitors Ca1 and Cp1, the capacitors Ca2 and Cp2 are provided for the purpose of stabilizing the reference potential of the power reception device 201. A connection point between the capacitors Ca2 and Cp2 is connected to the reference potential of the power transmission device 101. The capacitor Ca2 corresponds to a "first power-reception capacitor" according to the present disclosure, and the capacitor Cp2 corresponds to a "second power-reception capacitor" according to the present disclosure.

In addition, the power reception device 201 includes a reference potential electrode 24. The reference potential electrode 24 is connected to the reference potential of the power reception device 201. When the power reception device 201 is placed (mounted) on the power transmission device 101, a portion of the reference potential electrode 24 is opposed to the reference potential electrode 14. Accordingly, the reference potential of the power reception device 201 is connected to the reference potential of the power transmission device 101 via a capacitance formed between the reference potential electrodes 14 and 24 opposed to each other. The reference potential electrode 24 corresponds to a "power-reception reference potential electrode" according to the present disclosure.

The primary winding of a step-down transformer T2 is connected to the active electrode 22 and the passive electrode 23. A diode bridge DB is connected to the secondary winding of the step-down transformer T2, and a smoothing circuit composed of a capacitor C3 and an inductor L2 is further connected to the secondary winding of the step-down transformer T2. The step-down transformer T2 steps down a voltage induced by the active electrode 22 and the passive electrode 23. The diode bridge DB and the smoothing circuit rectify and smooth the voltage stepped-down by the step-down transformer T2, and supply the voltage to the load circuit RL.

In addition, a capacitor C2 is connected to the primary winding of the step-down transformer T2. The capacitor C2 forms a parallel resonant circuit together with the secondary winding of the step-down transformer T2. The resonant frequency of the parallel resonant circuit is set so as to be equal to the resonant frequency of the series resonant circuit formed in the power transmission device 101. Since the resonant frequencies of the resonant circuits of the power transmission device 101 and the power reception device 201 are set so as to be equal to each other, it is possible to efficiently transfer electric power from the power transmission device 101 to the power reception device 201.

Figure 2:
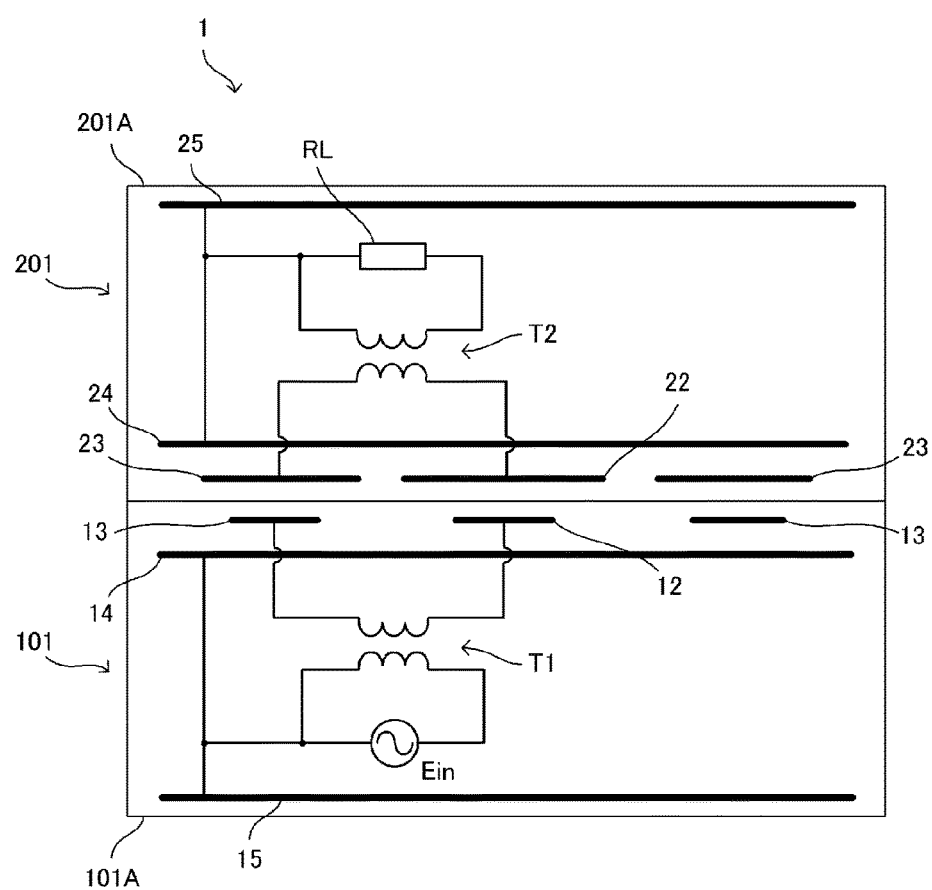
FIG. 2 is a schematic diagram of a circuit in a state where a power reception device is placed on a power transmission device.

FIG. 2 is a schematic diagram of a circuit in a state where the power reception device 201 is placed on the power transmission device 101. In FIG. 2, a portion of the circuit shown in FIG. 1 is not shown. In addition, the power supply 10 and the inverter circuit 11 described with reference to FIG. 1 are shown as a power supply Ein in FIG. 2.

The power transmission device 101 includes a housing 101A. The power reception device 201 includes a housing 201A. When the housing 201A of the power reception device 201 is placed on the housing 101A of the power transmission device 101, electric power is transferred from the power transmission device 101 to the power reception device 201. Hereinafter, surfaces that are in contact with each other when the housing 201A is placed on the housing 101A are referred to as placement surfaces of the housings 101A and 201A.

The active electrode 12 and the passive electrode 13 of the power transmission device 101 are provided on the same plane along the placement surface of the housing 101A. The reference potential electrode 14 is provided parallel to the active electrode 12 and the passive electrode 13 such that the active electrode 12 and the passive electrode 13 are located at the placement surface side of the housing 101A. In addition, the power transmission device 101 includes a shield electrode 15 provided along a surface of the housing 101A opposite to the placement surface of the housing 101A. The shield electrode 15 has the same potential as that of the reference potential electrode 14.

The active electrode 22 and the passive electrode 23 of the power reception device 201 are provided on the same plane along the placement surface of the housing 201A. The reference potential electrode 24 is provided parallel to the active electrode 22 and the passive electrode 23 such that the active electrode 22 and the passive electrode 23 are located at the placement surface side of the housing 201A. In addition, the power reception device 201 includes a shield electrode 25 provided along a surface of the housing 201A opposite to the placement surface of the housing 201A. The shield electrode 25 has the same potential as that of the reference potential electrode 24.

As described above, when the power reception device 201 is placed on the power transmission device 101, the active electrodes 12 and 22 are opposed to each other, and the passive electrodes 13 and 23 are opposed to each other. In addition, the reference potential electrodes 14 and 24 are opposed to each other with the active electrodes 12 and 22 and the passive electrodes 13 and 23 interposed therebetween. Furthermore, the active electrodes 12 and 22, the passive electrodes 13 and 23, and the reference potential electrodes 14 and 24 are interposed between the shield electrodes 15 and 25. Radiation of noise generated within the power transmission device 101 and the power reception device 201 is suppressed by the shield electrodes 15 and 25.

Figure 3A:
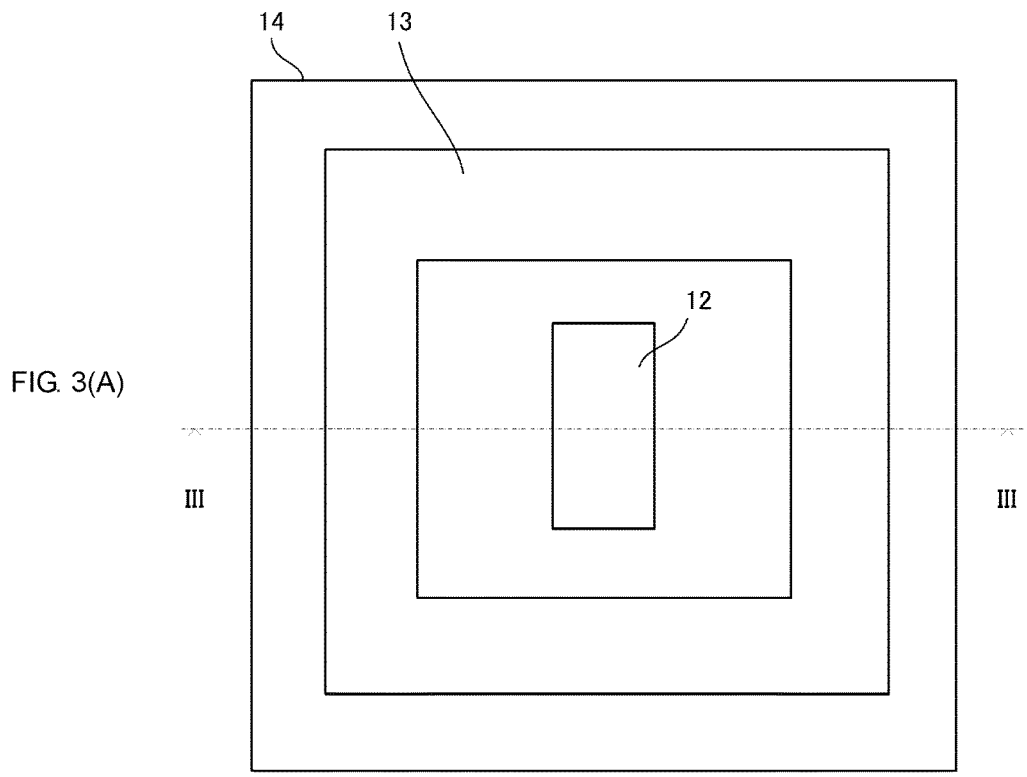
FIG. 3(A) is a perspective plan view of a placement surface of the power transmission device and FIG. 3(B) is a cross-sectional view taken along the line III-III in FIG. 3(A).
Figure 3B:
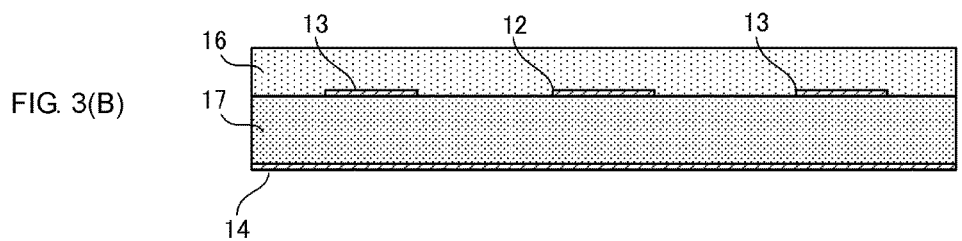

FIG. 3(A) is a perspective plan view of the placement surface of the power transmission device 101. FIG. 3(B) is a cross-sectional view taken along the line III-III in FIG. 3(A).

Each of the active electrode 12 and the passive electrode 13 has a flat plate shape. The active electrode 12 is rectangular, and the passive electrode 13 is formed so as to surround the active electrode 12. In addition, the reference potential electrode 14 has such a size as to cover the entirety of the active electrode 12 and the passive electrode 13 in a plan view.

In the power transmission device 101, insulating layers 16 and 17 are formed inward from the placement surface of the housing 101A. The active electrode 12 and the passive electrode 13 are provided between the insulating layers 16 and 17. The reference potential electrode 14 is provided at the outermost layer of the insulating layer 17. The insulating layers 16 and 17 may be any members as long as the insulating layers 16 and 17 are insulating members such as resin. The insulating layer 16 corresponds to a "first insulating layer" and the insulating layer 17 corresponds to a "second insulating layer" according to the present disclosure.

Figure 4A:
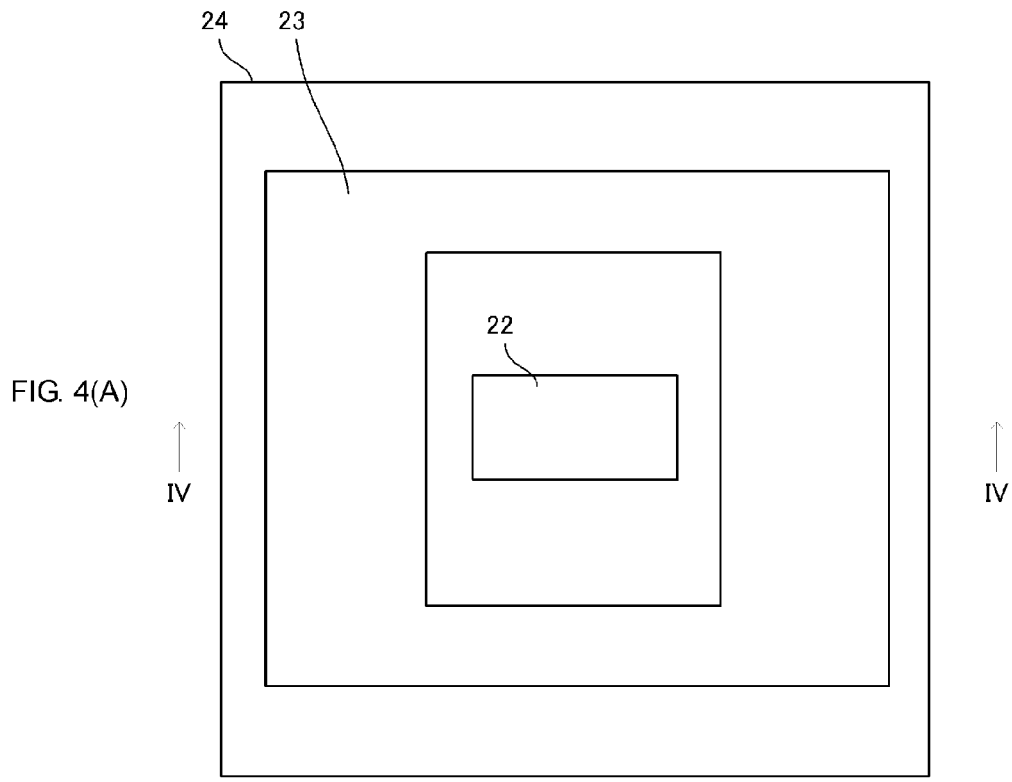
FIG. 4(A) is a perspective plan view of a placement surface of the power reception device and FIG. 4(B) is a cross-sectional view taken along the line IV-IV in FIG. 4(A).
Figure 4B:
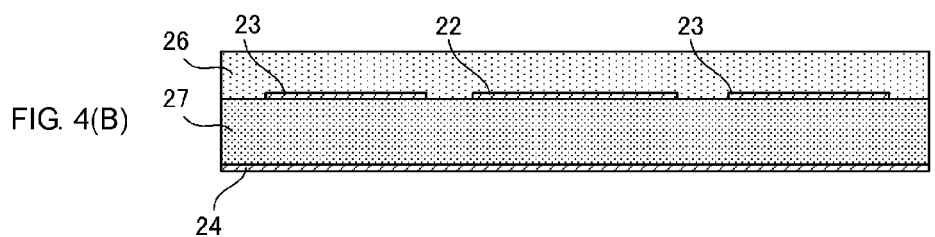

FIG. 4(A) is a perspective plan view of the placement surface of the power reception device 201. FIG. 4(B) is a cross-sectional view taken along the line IV-IV in FIG. 4(A).

Each of the active electrode 22 and the passive electrode 23 has a flat plate shape. The active electrode 22 is rectangular, and the passive electrode 23 is formed so as to surround the active electrode 22. In addition, the reference potential electrode 24 has such a size as to cover the entirety of the active electrode 22 and the passive electrode 23 in a plan view.

In the power reception device 201, insulating layers 26 and 27 are formed inward from the placement surface of the housing 201A. The active electrode 22 and the passive electrode 23 are provided between the insulating layers 26 and 27. The reference potential electrode 24 is provided at the outermost layer of the insulating layer 27. The insulating layers 26 and 27 may be any members as long as the insulating layers 26 and 27 are insulating members such as resin. The insulating layer 26 corresponds to a "third insulating layer" and the insulating layer 27 corresponds to a "fourth insulating layer" according to the present disclosure.

When the power reception device 201 having the electrodes shown in FIGS. 4(A) and 4(B) is placed on the power transmission device 101 having the electrodes shown in FIGS. 3(A) and 3(B), a cross capacitance occurs due to the differences in size and shape between the electrodes in a plan view. Hereinafter, the cross capacitance will be described.

Figure 5:
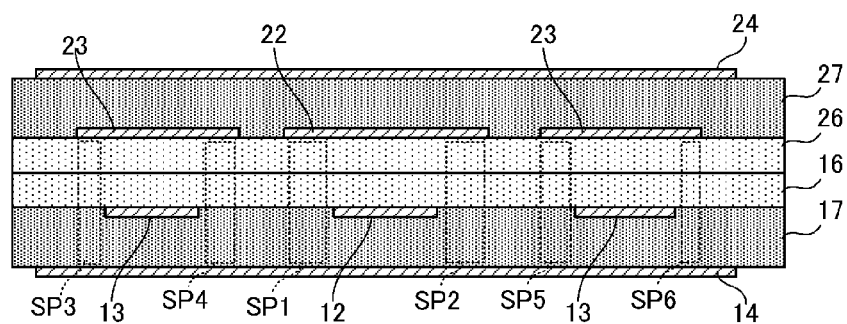
FIG. 5 is a cross-sectional view for illustrating a cross capacitance.

FIG. 5 is a cross-sectional view for illustrating the cross capacitance. The cross-sectional view shown in FIG. 5 corresponds to a view obtained by overlaying the cross-sectional view in FIG. 4(B) on the cross-sectional view in FIG. 3(B) such that the placement surfaces of the power transmission device 101 and the power reception device 201 are in contact with each other.

When the power reception device 201 is placed on the power transmission device 101, the active electrodes 12 and 22 are opposed to each other, and the passive electrodes 13 and 23 are opposed to each other. At this time, the active electrodes 12 and 22, which are rectangular, are opposed to each other such that the longitudinal directions thereof are orthogonal to each other. Therefore, as shown in FIG. 5, the active electrode 22 has a portion that is not opposed to the active electrode 12. The portion of the active electrode 22 that is not opposed to the active electrode 12 is opposed to the reference potential electrode (dotted-line regions SP1 and SP2 in the drawing), and a capacitance occurs in the regions SP1 and SP2. This capacitance becomes a cross capacitance.

Similarly, the passive electrode 23 has a portion that is not opposed to the passive electrode 13, this portion is opposed to the reference potential electrode 14 (dotted-line regions SP3, SP4, SP5, and SP6 in the drawing), and a capacitance occurs in the regions SP3, SP4, SP5, and SP6. This capacitance becomes a cross capacitance.

Figure 6:
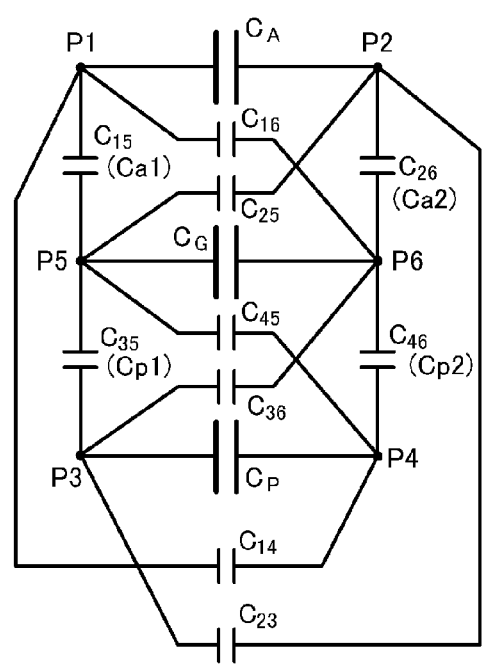
FIG. 6 is a circuit diagram of a portion of the power transfer system including parasitic capacitances.

The cross capacitance illustrated in FIG. 5 is an example, and an occurring cross capacitance is different depending on a position at which the power reception device 201 is placed relative to the power transmission device 101. Hereinafter, the cross capacitance occurring in the power transfer system 1 will be described. FIG. 6 is a circuit diagram of a portion of the power transfer system 1 including parasitic capacitances.

In the circuit in FIG. 1, a connection point between the capacitor Ca1 and the active electrode 12 is denoted by P1, a connection point between the capacitor Ca2 and the active electrode 22 is denoted by P2, a connection point between the capacitor Cp1 and the passive electrode 13 is denoted by P3, and a connection point between the capacitor Cp2 and the passive electrode 23 is denoted by P4. In addition, the connection point between the capacitors Ca1 and Cp1 is denoted by P5, and the connection point between the capacitors Ca2 and Cp2 is denoted by P6.

In this case, a parasitic capacitance occurs each between P1 and P4, between P1 and P6, between P2 and P3, P2 and P5, between P3 and P6, and between P4 and P5. A parasitic capacitance $C_{14}$ occurs between P1 and P4, and a parasitic capacitance $C_{16}$ occurs between P1 and P6. A parasitic capacitance $C_{23}$ occurs between P2 and P3, and a parasitic capacitance $C_{25}$ occurs between P2 and P5. A parasitic capacitance $C_{36}$ occurs between P3 and P6, and a parasitic capacitance $C_{45}$ occurs between P4 and P5.

In FIG. 6, for convenience of explanation, the capacitors Ca1, Cp1, Ca2, and Cp2 described with reference to FIG. 1 are represented by $C_{15}$, $C_{35}$, $C_{26}$, and $C_{46}$. In addition, a capacitance formed between the active electrodes 12 and 22 is represented by $C_A$, a capacitance formed between the passive electrodes 13 and 23 is represented by $C_P$, and a capacitance formed between the reference potential electrodes 14 and 24 is represented by $C_G$. The capacitance of each capacitance is represented by the same reference sign for each capacitance.

In the circuit shown in FIG. 6, by satisfying formulas (1) and (2) below, it is possible to cause the reference potential of the power reception device 201 to approach the reference potential of the power transmission device 101. Since the reference potential of the power transmission device 101 is connected to earth (or a desk, etc.) and is stable, the reference potential of the power reception device 201 can also be stabilized by causing the reference potential of the power reception device 201 to approach the reference potential of the power transmission device 101. The reference potential of the power transmission device 101 may not be connected to earth, and the reference potential of the power reception device 201 may be stabilized by shielding electrolysis leaking to earth using a shield electrode.

[Math. 1]

$$\frac{1+\dfrac{C_{35}}{C_{25}+C_{45}}\cdot\dfrac{\Sigma G}{C_P+C_{23}}}{1+\dfrac{C_{15}}{C_{25}+C_{45}}\cdot\dfrac{\Sigma G}{C_A+C_{14}}}=\frac{1+\dfrac{C_{36}}{C_{26}+C_{46}}\cdot\dfrac{\Sigma G}{C_P+C_{23}}}{1+\dfrac{C_{16}}{C_{26}+C_{46}}\cdot\dfrac{\Sigma G}{C_A+C_{14}}} \quad (1)$$

$$\frac{1+\dfrac{C_{45}}{C_{15}+C_{35}}\cdot\dfrac{\Sigma L}{C_P+C_{14}}}{1+\dfrac{C_{25}}{C_{15}+C_{35}}\cdot\dfrac{\Sigma L}{C_A+C_{23}}}=\frac{1+\dfrac{C_{46}}{C_{16}+C_{36}}\cdot\dfrac{\Sigma L}{C_P+C_{14}}}{1+\dfrac{C_{26}}{C_{16}+C_{36}}\cdot\dfrac{\Sigma L}{C_A+C_{23}}} \quad (2)$$

Moreover, $\Sigma G = C_A + C_P + C_{14} + C_{23} + C_{26} + C_{46} + C_{25} + C_{45}$ and $\Sigma L = C_A + C_P + C_{14} + C_{23} + C_{16} + C_{36} + C_{15} + C_{35}$.

Hereinafter, a method for deriving the conditions of formulas (1) and (2) and the reason why the reference potential of the power reception device 201 approaches the reference potential of the power transmission device 101 when the conditions are satisfied, will be described.

Figure 7:
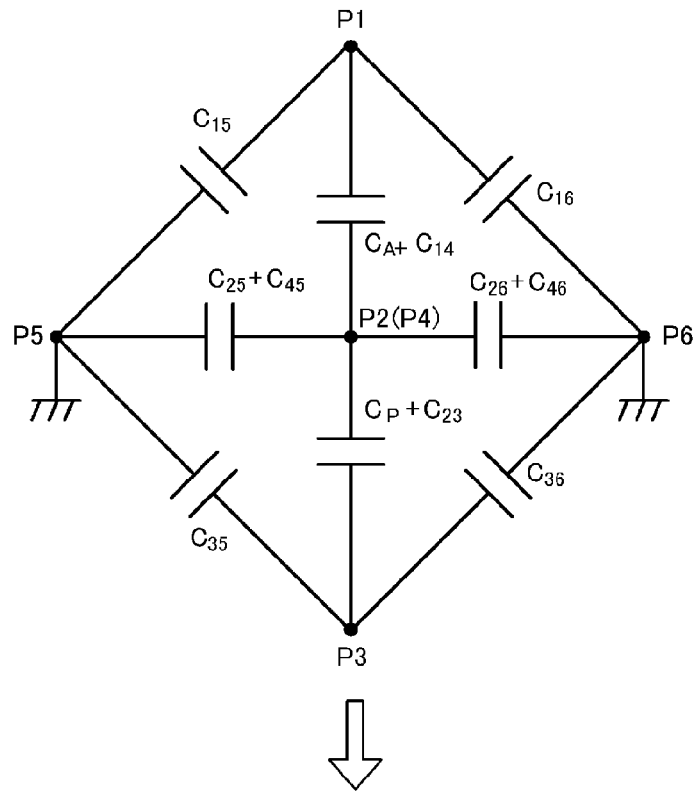
FIG. 7 is an equivalent circuit diagram of FIG. 6 in the case where an active electrode and a passive electrode of the power reception device are short-circuited.
Figure 7:
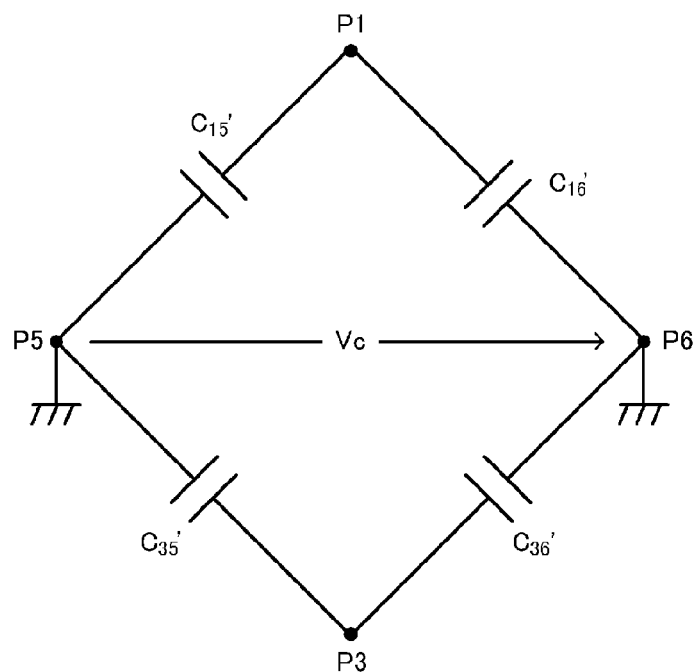

First, the case where the active electrode 22 and the passive electrode 23 are short-circuited in the circuit in FIG. 1 is considered. FIG. 7 is an equivalent circuit diagram of FIG. 6 when the active electrode 22 and the passive electrode 23 of the power reception device 201 are short-circuited.

In this case, the potentials at P2 and P4 become equal to each other, so that a circuit shown in the upper part of FIG. 7 is established. When the circuit shown in the upper part of FIG. 7 is subjected to star-mesh conversion, a bridge circuit shown in the lower part of FIG. 7 is established. Here, capacitors $C_{15}'$, $C_{16}'$, $C_{35}'$, and $C_{36}'$ of the bridge circuit are represented by formulas below.

[Math. 2]

$$C_{15}' = C_{15} + \frac{(C_A + C_{14})(C_{25} + C_{45})}{\Sigma G}$$

$$C_{16}' = C_{16} + \frac{(C_A + C_{14})(C_{26} + C_{46})}{\Sigma G}$$

$$C_{35}' = C_{35} + \frac{(C_P + C_{23})(C_{25} + C_{45})}{\Sigma G}$$

$$C_{36}' = C_{36} + \frac{(C_P + C_{23})(C_{26} + C_{46})}{\Sigma G}$$

In the bridge circuit in FIG. 7, from a balance condition of the bridge circuit, by satisfying:

$$C_{35}'/C_{15}' = C_{36}'/C_{16}' \quad (3),$$

the potential difference Vc between P5 and P6 becomes 0.

Figure 8:
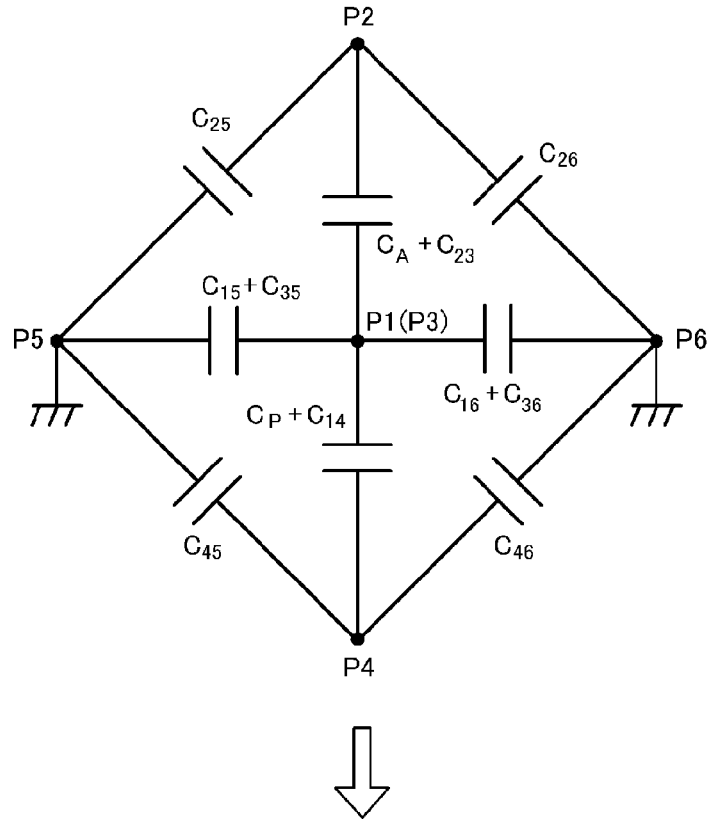
FIG. 8 is an equivalent circuit diagram of FIG. 6 in the case where an active electrode and a passive electrode of the power transmission device are short-circuited.
Figure 8:
Figure 8:
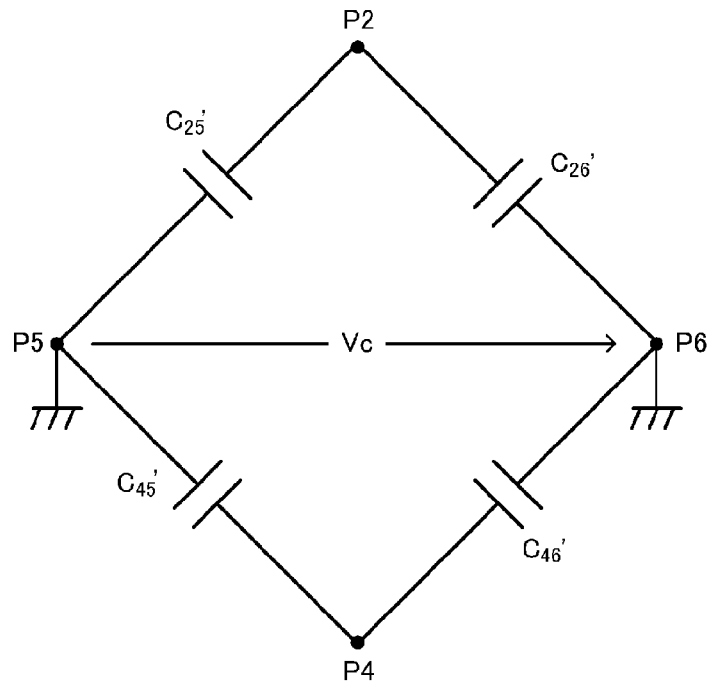

Next, the case where the active electrode 12 and the passive electrode 13 are short-circuited in the circuit in FIG. 1 is considered. FIG. 8 is an equivalent circuit diagram of FIG. 6 when the active electrode 12 and the passive electrode 13 of the power transmission device 101 are short-circuited.

In this case, the potentials at P1 and P3 become equal to each other, so that a circuit shown in the upper part of FIG. 8 is established. When the circuit shown in the upper part of FIG. 8 is subjected to star-mesh conversion, a bridge circuit shown in the lower part of FIG. 8 is established. Here, capacitors $C_{25}'$, $C_{26}'$, $C_{45}'$, and $C_{46}'$ of the bridge circuit are represented by formulas below.

[Math. 3]

$$C_{25}' = C_{25} + \frac{(C_A + C_{23})(C_{15} + C_{35})}{\Sigma L}$$

$$C_{26}' = C_{26} + \frac{(C_A + C_{23})(C_{16} + C_{36})}{\Sigma L}$$

$$C_{45}' = C_{45} + \frac{(C_P + C_{14})(C_{15} + C_{35})}{\Sigma L}$$

$$C_{46}' = C_{46} + \frac{(C_P + C_{14})(C_{16} + C_{36})}{\Sigma L}$$

In the bridge circuit in FIG. 8, from a balance condition of the bridge circuit, by satisfying:

$$C_{45}'/C_{25}' = C_{46}'/C_{26}' \quad (4),$$

the potential difference Vc between P5 and P6 becomes 0.

It is possible to derive the conditions of formulas (1) and (2) from formulas (3) and (4). Then, by satisfying the conditions of formulas (1) and (2), the potential difference Vc between P5 and P6 becomes 0. That is, the reference potentials of the power transmission device 101 and the power reception device 201 become equal to each other. As a result, the reference potential of the power reception device 201 becomes stable.

Next, a structure example of the power transmission device 101 and the power reception device 201 for satisfying the conditions of formulas (1) and (2) will be described.

Figure 9:
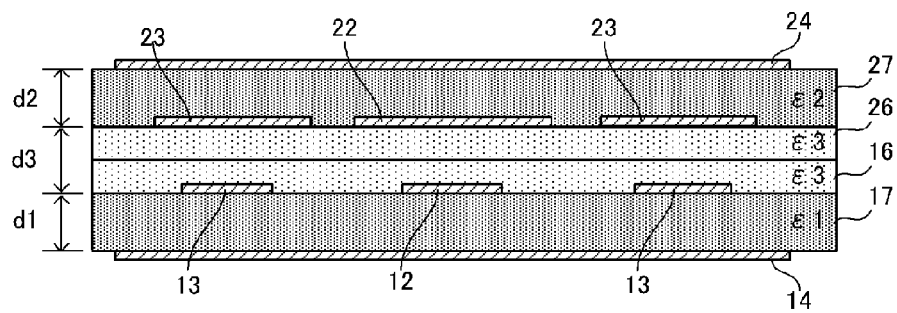
FIG. 9 is a cross-sectional view of an electrode portion in a state where the power reception device is placed on the power transmission device.

FIG. 9 is a cross-sectional view of an electrode portion in a state where the power reception device 201 is placed on the power transmission device 101. FIG. 9 corresponds to the cross-sectional view shown in FIG. 5.

To satisfy formulas (1) and (2), the ratio between the thickness and the dielectric constant of each of the insulating layers 16, 17, 26, and 27 is made uniform in a planar direction. Between the active electrode 12 and the passive electrode 13 and the active electrode 22 and the passive electrode 23, the two insulating layers 16 and 26 are regarded as a single insulating layer.

Specifically, in the insulating layer 17 between the active electrode 12 and the passive electrode 13 and the reference potential electrode 14, when the dielectric constant is represented by ∈1 and the thickness is represented by d1, ∈1/d1 is made uniform in the planar direction. In addition, in the insulating layer 27 between the active electrode 22 and the passive electrode 23 and the reference potential electrode 24, when the dielectric constant is represented by ∈2 and the thickness is represented by d2, ∈2/d2 is made uniform in the planar direction. Furthermore, in the insulating layers 16 and 26 between the active electrode 12 and the passive electrode 13 and the active electrode 22 and the passive electrode 23, when the dielectric constant is represented by ∈3 and the total thickness is represented by d3, ∈3/d3 is made uniform in the planar direction.

In the case where the insulating layers 16 and 26 are opposed to each other at regular positions, the insulating layers 16 and 26 suffice to be uniform. If the dielectric constants of the respective insulating layers are equal to each other, the boundary surface between the insulating layers 16 and 26 does not necessarily need be a flat surface, and may have, for example, an uneven shape such that the insulating layers 16 and 26 are fitted to each other. In addition, if the thicknesses d1, d2, and d3 of the respective insulating layers 16, 17, 26, and 27 are equal to each other, the dielectric constants of the respective insulating layers may be different from each other.

As described above, when the thicknesses and the dielectric constants of the respective insulating layers are adjusted, formulas (1) and (2) are satisfied. In the structure shown in FIG. 9, the influence of the thickness of each electrode is neglected. Thus, hereinafter, a structure example in the case where the thickness of each electrode is taken into consideration will be described.

Figure 10:
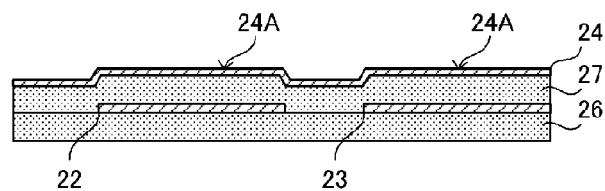
FIG. 10 is a diagram for illustrating a structure example in the case where the thickness of each electrode is taken into consideration.

FIG. 10 is a diagram for illustrating the structure example in the case where the thickness of each electrode is taken into consideration. FIG. 10 shows only the electrodes and the insulating layers in the power reception device 201.

Each of the active electrode 22 and the passive electrode 23 has a thickness. Thus, in the insulating layer 27, the thickness T1 of a portion where the reference potential electrode 24 is opposed to the active electrode 22 and the passive electrode 23 and the thickness T2 of a portion where the reference potential electrode 24 is not opposed to the active electrode 22 and the passive electrode 23 have a relationship of T1<T2. Therefore, as shown in FIG. 10, a projection 24A is provided in each of regions where the reference potential electrode 24 is opposed to the active electrode 22 and the passive electrode 23, and at the upper side in FIG. 10. Accordingly, the thickness T1 increases, so that it is possible to make T1 and T2 substantially equal to each other. As a result, as described with reference to FIG. 9, in the planar direction of each insulating layer, it is possible to make the ratio between the dielectric constant and the thickness uniform.

Regarding the ratio between the dielectric constant and the thickness being uniform, the value of the ratio does not necessarily need to be completely uniform in the planar direction of the insulating layer, and the ratio suffices to fall within a range where formulas (1) and (2) are satisfied and the reference potential of the power reception device 201 approaches the reference potential of the power transmission device 101. In addition, the ratio between the dielectric constant and the thickness may not be uniformly distributed in the planar direction of the insulating layer. For example, a case is also included in which the ratio between the dielectric constant and the thickness is high in a portion and is low in another portion in the planar direction of the insulating layer.

Figure 11A:
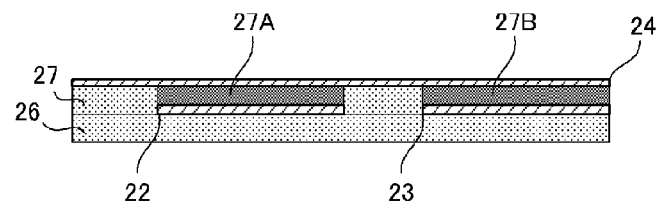
FIGS. 11(A) and 11(B) are diagrams for illustrating a structure example in the case where a ratio between a dielectric constant and a thickness is not distributed uniformly in a planar direction of an insulating layer.
Figure 11B:
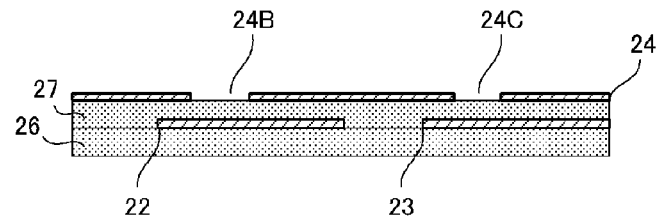

FIGS. 11(A) and 11(B) are diagrams for illustrating structure examples in the case where the ratio of the dielectric constant and the thickness is not distributed uniformly in the planar direction of the insulating layer. These figures shows only the electrodes and the insulating layers in the power reception device 201.

In FIG. 11(A), in the insulating layer 27 and between the active electrode 22 and the reference potential electrode 24, a low-dielectric-constant portion 27A having a lower dielectric constant than the other portion of the insulating layer 27 is provided. Similarly, in the insulating layer 27 and between the passive electrode 23 and the reference potential electrode 24, a low-dielectric-constant portion 27B having a lower dielectric constant than the other portion of the insulating layer 27 is provided. According to the exemplary embodiment, each of the low-dielectric-constant portions 27A and 27B has a dielectric constant that makes the ratio between the dielectric constant and the thickness uniform in the planar direction of the insulating layer 27. When the low-dielectric-constant portions 27A and 27B are provided, the power reception device 201 has a structure in which the dielectric constant of a portion is lower than the dielectric constant of another portion in the planar direction of the insulating layer 27. In this case, even if the thickness of the insulating layer 27 is not uniform in the planar direction due to the thickness of the electrode, it is possible to make the ratio between the thickness and the dielectric constant of the insulating layer 27 uniform by changing the dielectric constant.

In FIG. 11(B), the reference potential electrode 24 has cavities (portions where the reference potential electrode 24 is not formed) 24B and 24C in portions thereof opposed to the active electrode 22 and the passive electrode 23. In this case, each of the dielectric constant between the active electrode 22 and the reference potential electrode 24 and the dielectric constant between the passive electrode 23 and the reference potential electrode 24 is equal to the dielectric constant of the insulating layer 27, but the thickness of the insulating layer 27 in each of the regions where the active electrode 22 and the passive electrode 23 are provided is smaller than that in the other region in the planar direction of the insulating layer 27. At this time, when the cavities 24B and 24C are formed so as to have appropriate sizes, it is possible to make the ratio between the thickness and the dielectric constant of the insulating layer 27 by adjusting the electrostatic capacity between the active electrode 22 and the reference potential electrode 24 and the electrostatic capacity of the passive electrode 23 and the reference potential electrode 24 so as to decrease the electrostatic capacities to equivalently decrease the dielectric constant.

As described above, by providing the low-dielectric-constant portions 27A and 27B or forming the cavities 24B and 24C, it is possible to perform adjustment such that the stable condition for the reference potential is satisfied. In FIGS. 11(A) and 11(B), the positions at which the low-dielectric-constant portions 27A and 27B are provided, and the positions at which the cavities 24B and 24C are formed, are preferably positions opposed to the active electrode 22 and the passive electrode 23. The provision of the low-dielectric-constant portions 27A and 27B or the like at the positions does not influence the parasitic capacitances formed with the partner side, that is, the power transmission device 101 side.

In FIGS. 10 and 11, the power reception device 201 side has been described, but the same applies to the power transmission device 101 side.

Figure 12A:
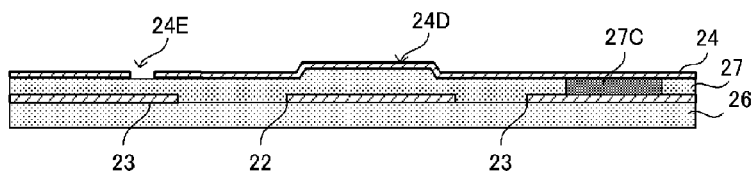
FIGS. 12(A) and 12(B) are diagrams for illustrating a structure example in the case where a wire for each electrode is taken into consideration.
Figure 12B:
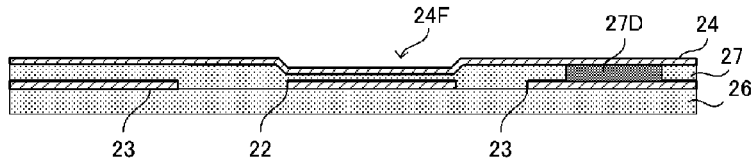

FIGS. 12(A) and 12(B) are diagrams for illustrating structure examples in the case where a wire for each electrode is taken into consideration. As described with reference to FIG. 2, the wire is connected to each electrode. Thus, in the case where the influence of a parasitic capacitance other than the electrode portion, for example, the influence of the parasitic capacitance by the wire, cannot be neglected, formulas (1) and (2) are caused to be satisfied by deleting or adding a capacitance between the electrodes. FIGS. 12(A) and 12(B) show only the electrodes and the insulating layer in the power reception device 201.

FIG. 12(A) is a configuration example in the case of deleting a capacitance. In this case, a projection 24D is provided in the portion of the reference potential electrode 24 to which the active electrode 22 is opposed, so as to project upward in FIG. 12(A), and an cavity 24E is provided in the portion of the reference potential electrode 24 to which the passive electrode 23 is opposed. In addition, a low-dielectric-constant layer 27C is provided between the passive electrode 23 and the reference potential electrode 24.

FIG. 12(B) is a configuration example in the case of adding a capacitance. In this case, a recess 24F is provided in the portion of the reference potential electrode 24 to which the active electrode 22 is opposed, so as to be recessed downward in FIG. 12(B). In addition, a high-dielectric-constant layer 27D is provided between the passive electrode 23 and the reference potential electrode 24.

As described above, there is a possibility that due to the influence of the wire or the like, formulas (1) and (2) are not satisfied, but it is possible to avoid this by deleting or adding a capacitance as appropriate.

In the case of adding a capacitance, a capacitor may be incorporated into the insulating layer or may be connected via a wire on an insulating substrate surface, without changing the shapes of the electrodes.

Figure 13:
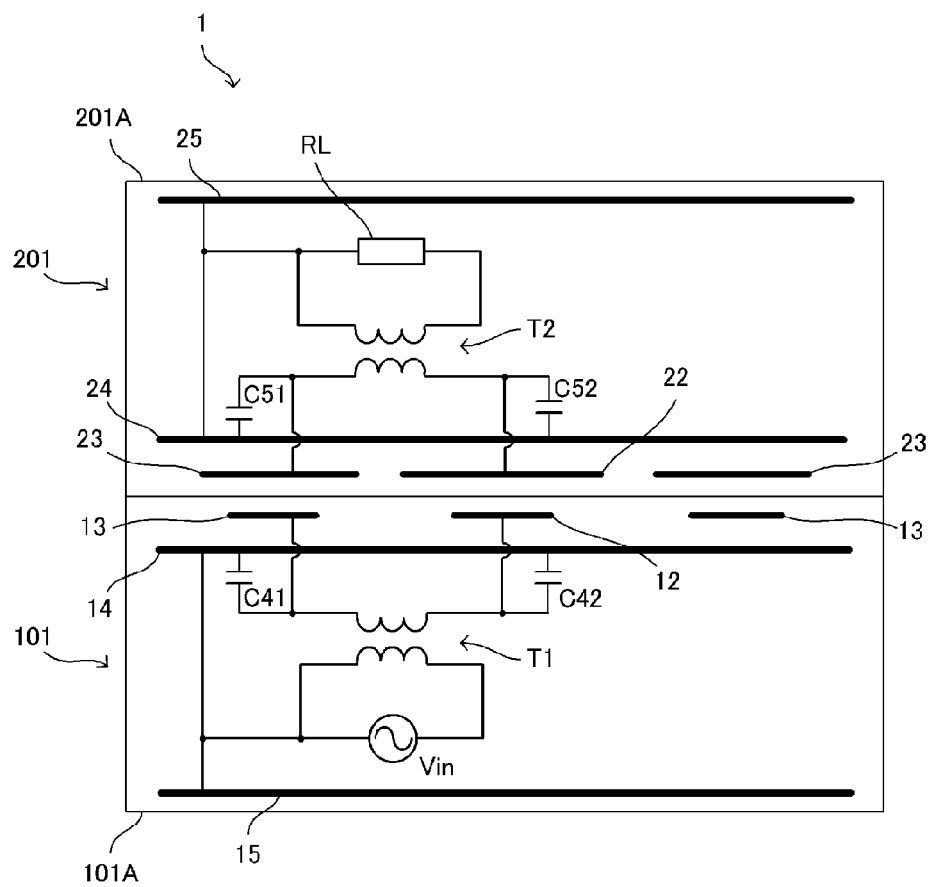
FIG. 13 is a schematic diagram of a circuit of the power transfer system in the case where a capacitor is added.

FIG. 13 is a schematic diagram of a circuit of the power transfer system 1 when a capacitor is added. In this case, in the power transmission device 101, capacitors C41 and C42 are connected between the active electrode 12 and the passive electrode 13 and the reference potential electrode 14. In addition, in the power reception device 201, capacitors C51 and C52 are connected between the active electrode 22 and the passive electrode 23 and the reference potential electrode 24. Each of the capacitors C41, C42, C51, and C52 is composed of, for example, a multilayer ceramic capacitor and corresponds to a "capacitance adjustment element" according to an exemplary embodiment. In this case, even after the electrodes and the like are formed, by adding capacitors as appropriate, it is possible to satisfy formulas (1) and (2). Moreover, it should be understood that the positions where the capacitors C41, C42, C51, and C52 are connected can be adjusted as appropriate.

REFERENCE SIGNS LIST 1 power transfer system
10 power source (voltage applying circuit)
11 inverter circuit (voltage applying circuit)
12, 22 active electrode
13, 23 passive electrode
14, 24 reference potential electrode
15, 25 shield electrode
16, 17, 26, 27 insulating layer
24A projection
24B, 24C cavity
24D projection
24E cavity
24F recess
27A, 27B low-dielectric-constant portion
27C low-dielectric-constant layer
27D high-dielectric-constant layer
101 power transmission device
101A, 201A housing
201 power reception device
Ca1, Cp1, Ca2, Cp2 capacitor
DB diode bridge
RL load circuit
T1 step-up transformer
T2 step-down transformer

The invention claimed is:

1. A power transfer system comprising:
a power transmission device including:
first and second power-transmission electrodes,
a power-transmission reference potential electrode,
a power source configured to apply a voltage to the first and second power-transmission electrodes, and
first and second power-transmission capacitors connected in series between the first and second power-transmission electrodes, wherein a connection point P5 between the first and second power-transmission capacitors is connected to the power-transmission reference potential electrode, and the first and second power-transmission capacitors have capacitances of $C_{15}$ and $C_{35}$, respectively; and a power reception device including:
first and second power-reception electrodes,
a power-reception reference potential electrode,
a load circuit configured to supply a voltage generated in the first and second power-reception electrodes to a load, and
first and second power-reception capacitors connected in series between the first and second power-reception electrodes, wherein a connection point P6 between the first and second power-reception capacitors is connected to the power-reception reference potential electrode, and the first and second power-reception capacitors have capacitances of $C_{26}$ and $C_{46}$, respectively, wherein electric power is transferred from the power transmission device to the power reception device through electrical coupling when the power reception device is placed on the power transmission device such that the respective first, second, and reference potential electrodes of the respective devices oppose each other, wherein:
a connection point P1 is between the first power-transmission electrode and the first power-transmission capacitor,
a connection point P2 is between the first power-reception electrode and the first power-reception capacitor,
a connection point P3 is between the second power-transmission electrode and the second power-transmission capacitor,
a connection point P4 is between the second power-reception electrode and the second power-reception capacitor, wherein, when electric power is transferred from the power transmission device to the power reception device:
a parasitic capacitance $C_{14}$ occurs between P1 and P4,
a parasitic capacitance $C_{16}$ occurs between P1 and P6,
a parasitic capacitance $C_{23}$ occurs between P2 and P3,
a parasitic capacitance $C_{25}$ occurs between P2 and P5,
a parasitic capacitance $C_{36}$ occurs between P3 and P6,
a parasitic capacitance $C_{45}$ occurs between P4 and P5,
a capacitance $C_A$ occurs between the first power-transmission electrode and the first power-reception electrode, and
a capacitance $C_P$ occurs between second power-transmission electrode and the second power-reception electrode, and wherein the power transmission device and the power reception device have a structural configuration such that formulas (1) and (2) are satisfied as follows:

$$\frac{1+\frac{C_{35}}{C_{25}+C_{45}}\cdot\frac{\Sigma G}{C_P+C_{23}}}{1+\frac{C_{15}}{C_{25}+C_{45}}\cdot\frac{\Sigma G}{C_A+C_{14}}} = \frac{1+\frac{C_{36}}{C_{26}+C_{46}}\cdot\frac{\Sigma G}{C_P+C_{23}}}{1+\frac{C_{16}}{C_{26}+C_{46}}\cdot\frac{\Sigma G}{C_A+C_{14}}} \quad (1)$$

$$\frac{1+\frac{C_{45}}{C_{15}+C_{35}}\cdot\frac{\Sigma L}{C_P+C_{14}}}{1+\frac{C_{25}}{C_{15}+C_{35}}\cdot\frac{\Sigma L}{C_A+C_{23}}} = \frac{1+\frac{C_{46}}{C_{16}+C_{36}}\cdot\frac{\Sigma L}{C_P+C_{14}}}{1+\frac{C_{26}}{C_{16}+C_{36}}\cdot\frac{\Sigma L}{C_A+C_{23}}} \quad (2)$$

wherein $\Sigma G = C_A + C_P + C_{14} + C_{23} + C_{26} + C_{46} + C_{25} + C_{45}$, and $\Sigma L = C_A + C_P + C_{14} + C_{23} + C_{16} + C_{36} + C_{15} + C_{35}$.

2. The power transfer system according to claim 1,
wherein the first and second power-transmission electrodes each have a flat plate shape and are disposed in a same plane,
wherein the first and second power-reception electrodes each have a flat plate shape and are disposed in a same plane, and
wherein the power-transmission and power-reception reference potential electrodes each have a flat plate shape and oppose each other with the first and second power-transmission electrodes and the first and second power-reception electrode interposed therebetween when the power reception device is placed on the power transmission device.

3. The power transfer system according to claim 2,
wherein the power transmission device includes first and second insulating layers with the first and second power transmission electrodes disposed therebetween and a placement surface for the power transmission device disposed on an outer layer of the first insulating layer,
wherein the power-transmission reference potential electrode is disposed on an outer layer of the second insulating layer opposite to the outer layer of the first insulating layer,
wherein the power reception device includes third and fourth insulating layers with the first and second power reception electrodes disposed therebetween and a placement surface the power reception device disposed on an outer layer of the third insulating layer, and
wherein the power-reception reference potential electrode is disposed on an outer layer of the fourth insulating layer opposite to the outer layer of the third insulating layer.

4. The power transfer system according to claim 3, wherein a ratio between a dielectric constant and a thickness of each of the second and fourth insulating layers is uniform in a planar direction.

5. The power transfer system according to claim 4, wherein the power-transmission reference potential electrode comprises at least one of a recess, a projection, and a cavity in a portion thereof opposed to at least one of the first and second power-transmission electrodes.

6. The power transfer system according to claim 5, wherein the at least one of the recess, the projection, and the cavity of the power-transmission reference potential electrode define a thickness between the power-transmission reference potential electrode and the respective first or second power-transmission electrodes such that the thickness of the second insulating layer is constant in the planar direction.

7. The power transfer system according to claim 4, wherein the power-reception reference potential electrode comprises at least one of a recess, a projection, and a cavity in a portion thereof opposed to at least one of the first and second power-reception electrodes.

8. The power transfer system according to claim 7, wherein the at least one of the recess, the projection, and the cavity of the power-reception reference potential electrode define a thickness between the power-reception reference potential electrode and the respective first or second power-reception electrodes such that the thickness of the fourth insulating layer is constant in the planar direction.

9. The power transfer system according to claim 4, wherein the first and third insulating layers have dielectric constants equal to each other, and a ratio between the dielectric constant and a total thickness of the first and third insulating layers is uniform in the planar direction.

10. The power transfer system according to claim 9, wherein the dielectric constant of the second insulating layer in a region at least between either the first power-transmission electrode and the power-transmission reference potential electrode or between the second power-transmission electrode and the power-transmission reference potential electrode is different than the dielectric constant of the second insulating layer in another region thereof.

11. The power transfer system according to claim 9, wherein the dielectric constant of the fourth insulating layer in a region at least between either the first power-reception electrode and the power-reception reference potential electrode or between the second power-reception electrode and the power-reception reference potential electrode is different than the dielectric constant of the fourth insulating layer in another region thereof.

12. The power transfer system according to claim 1, wherein the structural configuration of at least one of the power transmission device and the power reception device includes a capacitance adjustment element having a capacitance that satisfies formulas (1) and (2).

13. The power transfer system according to claim 12, wherein the capacitance adjustment element is coupled between the power-transmission reference potential electrode and a step-up transformer coupled to the power source.

14. The power transfer system according to claim 12, wherein the capacitance adjustment element is coupled between the power-reception reference potential electrode and a step-down transformer coupled to the load circuit source.

15. A power transfer system comprising:
a power transmission device including:
first and second power-transmission electrodes that have a plate shape and are in a same plane,
first and second insulating layers with the first and second power transmission electrodes disposed therebetween,
a power-transmission reference potential electrode having a plate shape and disposed on an outer surface of the first insulating layer,
a placement surface disposed on an outer surface of the second insulating layer,
a power source configured to apply a voltage to the first and second power-transmission electrodes, and
first and second power-transmission capacitors connected in series between the first and second power-transmission electrodes, wherein a connection point P5 between the first and second power-transmission capacitors is connected to the power-transmission reference potential electrode, and the first and second power-transmission capacitors have capacitances of $C_{15}$ and $C_{35}$, respectively; and
a power reception device including:
first and second power-reception electrodes that have a plate shape and are in a same plane,
second and third insulating layers with the first and second power-reception electrodes disposed therebetween,
a power-reception reference potential electrode having a plate shape and disposed on an outer surface of the fourth insulating layer,
a placement surface disposed on an outer surface of the third insulating layer,
a load circuit configured to supply a voltage generated in the first and second power-reception electrodes to a load, and first and second power-reception capacitors connected in series between the first and second power-reception electrodes, wherein a connection point P6 between the first and second power-reception capacitors is connected to the power-reception reference potential electrode, and the first and second power-reception capacitors have capacitances of $C_{26}$ and $C_{46}$, respectively, wherein electric power is transferred from the power transmission device to the power reception device through electrical coupling when the placement surface of the power reception device is placed on the placement surface of the power transmission device, wherein a ratio between a dielectric constant and a thickness of each of the second and fourth insulating layers is uniform in a planar direction, and wherein the first and third insulating layers have dielectric constants equal to each other, and a ratio between the dielectric constant and a total thickness of the first and third insulating layers is uniform in the planar direction.

16. The power transfer system according to claim 15, wherein the power-transmission reference potential electrode comprises at least one of a recess, a projection, and a cavity in a portion thereof opposed to at least one of the first and second power-transmission electrodes.

17. The power transfer system according to claim 15, wherein the power-reception reference potential electrode comprises at least one of a recess, a projection, and a cavity in a portion thereof opposed to at least one of the first and second power-reception electrodes.

18. The power transfer system according to claim 15, wherein the dielectric constant of the second insulating layer in a region at least between either the first power-transmission electrode and the power-transmission reference potential electrode or between the second power-transmission electrode and the power-transmission reference potential electrode is different than the dielectric constant of the second insulating layer in another region thereof.

19. The power transfer system according to claim 15, wherein the dielectric constant of the fourth insulating layer in a region at least between either the first power-reception electrode and the power-reception reference potential electrode or between the second power-reception electrode and the power-reception reference potential electrode is different than the dielectric constant of the fourth insulating layer in another region thereof.

20. A power transfer system comprising:
a power transmission device including:
first and second power-transmission electrodes,
a power-transmission reference potential electrode,
a power source configured to apply a voltage to the first and second power-transmission electrodes, and
first and second power-transmission capacitors connected in series between the first and second power-transmission electrodes, wherein a connection point P5 between the first and second power-transmission capacitors is connected to the power-transmission reference potential electrode, and the first and second power-transmission capacitors have capacitances of $C_{15}$ and $C_{35}$, respectively; and
a power reception device including:
first and second power-reception electrodes,
a power-reception reference potential electrode,
a load circuit configured to supply a voltage generated in the first and second power-reception electrodes to a load, and
first and second power-reception capacitors connected in series between the first and second power-reception electrodes, wherein a connection point P6 between the first and second power-reception capacitors is connected to the power-reception reference potential electrode, and the first and second power-reception capacitors have capacitances of $C_{26}$ and $C_{46}$, respectively, wherein electric power is transferred from the power transmission device to the power reception device through electrical coupling when the power reception device is placed on the power transmission device such that the respective first, second, and reference potential electrodes of the respective devices oppose each other, wherein:
a connection point P1 is between the first power-transmission electrode and the first power-transmission capacitor,
a connection point P2 is between the first power-reception electrode and the first power-reception capacitor,
a connection point P3 is between the second power-transmission electrode and the second power-transmission capacitor,
a connection point P4 is between the second power-reception electrode and the second power-reception capacitor, wherein, when electric power is transferred from the power transmission device to the power reception device:
a parasitic capacitance $C_{14}$ occurs between P1 and P4,
a parasitic capacitance $C_{16}$ occurs between P1 and P6,
a parasitic capacitance $C_{23}$ occurs between P2 and P3,
a parasitic capacitance $C_{25}$ occurs between P2 and P5,
a parasitic capacitance $C_{36}$ occurs between P3 and P6,
a parasitic capacitance $C_{45}$ occurs between P4 and P5,
a capacitance $C_A$ occurs between the first power-transmission electrode and the first power-reception electrode, and
a capacitance $C_P$ occurs between second power-transmission electrode and the second power-reception electrode, and wherein at least one of the power transmission device and the power reception device includes a capacitance adjustment element such that formulas (1) and (2) are satisfied as follows:

$$\frac{1 + \frac{C_{35}}{C_{25}+C_{45}} \cdot \frac{\Sigma G}{C_P + C_{23}}}{1 + \frac{C_{15}}{C_{25}+C_{45}} \cdot \frac{\Sigma G}{C_A + C_{14}}} = \frac{1 + \frac{C_{36}}{C_{26}+C_{46}} \cdot \frac{\Sigma G}{C_P + C_{23}}}{1 + \frac{C_{16}}{C_{26}+C_{46}} \cdot \frac{\Sigma G}{C_A + C_{14}}} \quad (1)$$

$$\frac{1 + \frac{C_{45}}{C_{15}+C_{35}} \cdot \frac{\Sigma L}{C_P + C_{14}}}{1 + \frac{C_{25}}{C_{15}+C_{35}} \cdot \frac{\Sigma L}{C_A + C_{23}}} = \frac{1 + \frac{C_{46}}{C_{16}+C_{36}} \cdot \frac{\Sigma L}{C_P + C_{14}}}{1 + \frac{C_{26}}{C_{16}+C_{36}} \cdot \frac{\Sigma L}{C_A + C_{23}}} \quad (2)$$

wherein $\Sigma G = C_A + C_P + C_{14} + C_{23} + C_{26} + C_{46} + C_{25} + C_{45}$, and $\Sigma L = C_A + C_P + C_{14} + C_{23} + C_{16} + C_{36} + C_{15} + C_{35}$.

* * * * *